UNITED STATES PATENT OFFICE.

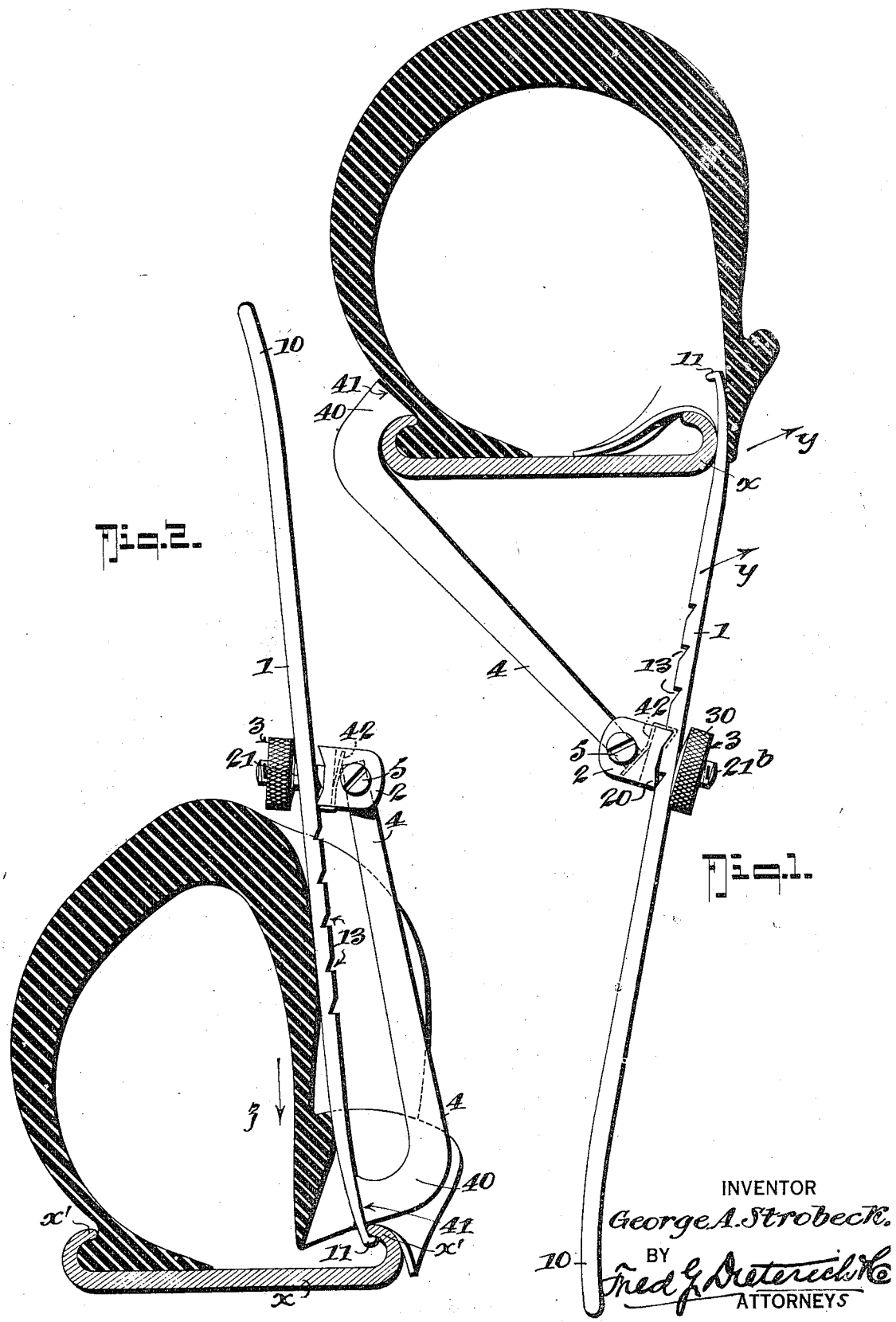

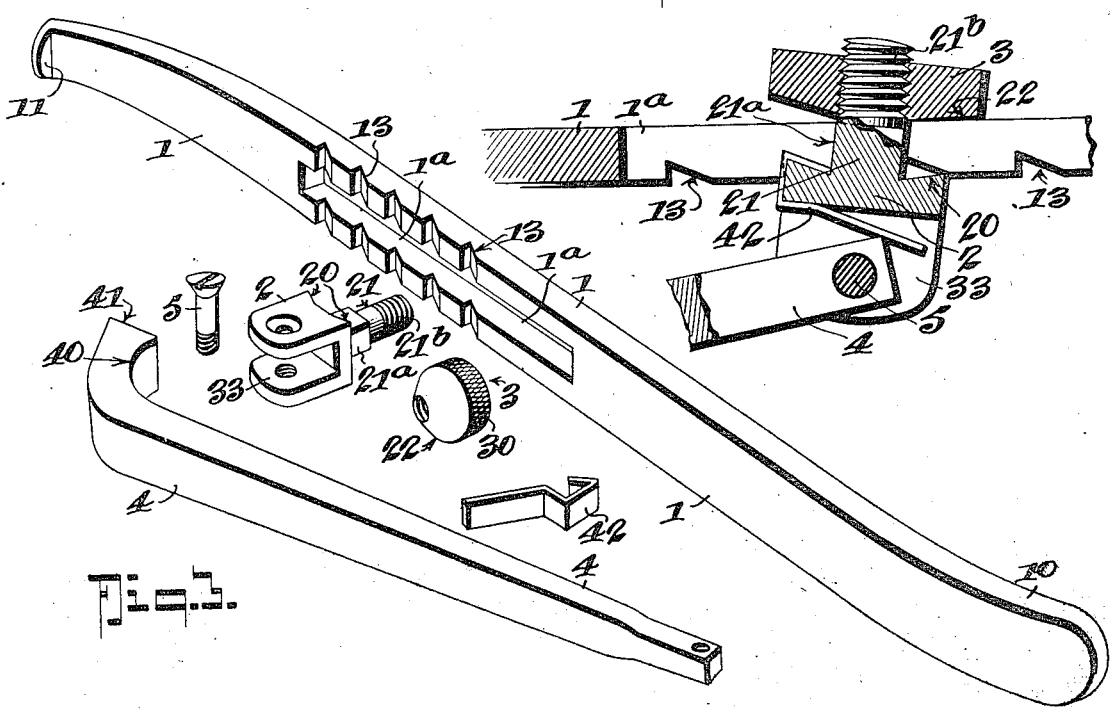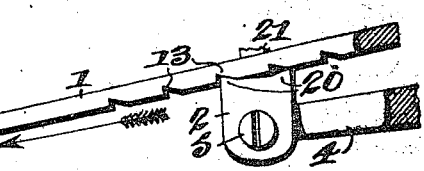

GEORGE A STROBECK, OF RED LION, PENNSYLVANIA.

TIRE-TOOL.

1,298,820.

Specification of Letters Patent.  Patented Apr. 1, 1919.

Application filed February 14, 1918. Serial No. 217,165.

*To all whom it may concern:*

Be it known that I, GEORGE A. STROBECK, a citizen of the United States, residing at Red Lion, in the county of York and State of Pennsylvania, have invented a new and Improved Tire-Tool, of which the following is a specification.

My invention has reference to improvements in that class of tools or implements, especially adapted for removing and replacing tires of the "clencher" type.

With the ordinary type of tire irons now in general use, more than one pair of hands are usually required in starting the tire on or off the rim and retaining the start until one can proceed further with the work.

My invention primarily seeks to provide an inexpensive and easily manufactured tire tool or implement of simple construction, in the use of which the objections or difficulties of holding the started tire to the on or off positions are overcome and which may be conveniently operated or adjusted by the user for quickly starting the tire to the on or off positions and for maintaining it at such positions as the complete adjustment of applying or removing the said tire, to or from the wheel rim, is effected.

With other objects in view that will hereinafter appear, my invention embodies in a tire tool of the general character stated, certain details of construction and novel arrangements of parts, all of which will be stated in the following description, specifically pointed out in the appended claim and illustrated in the accompanying drawings, in which:

Figure 1 is a diagrammatic cross section of an automobile tire and rim and showing my improved tire tool in place, the latter being shown as having started the tire off the rim and the auxiliary lever member positioned to provide the necessary leverage in the operation of forcing off adjacent portions of the tire.

Fig. 2 is a similar view, the tool being shown in the operation of applying a tire.

Fig. 3 is a detail perspective view of the several parts that constitute my invention, the same being shown separated.

Fig. 4 is an enlarged detail section taken through the slot of the main lever and illustrates the adjustable fulcrum member.

Fig. 5 is a diagrammatic cross section through a tire and the rim portion and illustrates the manner in which my improved tire tool is used for starting the tire off the rim.

In its practical development, my improved tire tool includes a main lever 1 that terminates at one end in a handle member 10 and whose other end tapers and terminates in a short angled hook or claw member 11.

Lever 1, along a distance of its length, is provided with a longitudinal slot $1^a$ and on one face thereof, that face from which the hook member 11 projects, the said lever has a series of transverse ratchet notches 13 that extend along the opposite edges of the slot $1^a$, as is clearly shown in Figs. 1 and 2.

A movable fulcrum or carrier block 2 coöperates with the slotted lever 1 and the said carrier includes a bifurcated body, the inner or bottom portion of which, at the opposite ends thereof, terminates in ratchet-like pawls or spurs 20—20, the purpose of which will presently appear.

The carrier 2 also includes a stem 21 formed with a flattened neck $21^a$ adapted to travel in the lever slot $1^a$ and with a threaded end $21^b$ for engaging with a combined clamp nut and cone bearing 3, shown in detail in Fig. 4.

Nut 3 has a milled head 30 and a cone-shape inner bearing face 22 for rockably engaging the flat side of the lever 1, when the fulcrum carrier is adjusted to the working positions.

4 designates a hook member that consists of a short arm, one end of which seats in a crotch 33 formed in the carrier 2 and it is pivotally mounted on a screw pin 5 that extends across the said crotch 33 and engages the carrier, as shown.

One end of the hook member 4 terminates in an inwardly turned hook 40 adapted for engaging with one edge of the rim flange when the tool is used for prying off the tire, as is shown in Fig. 1. The hook portion 40 terminates in a flat bearing face 41, the purpose of which will hereinafter appear.

From the foregoing description taken in connection with the accompanying drawings, the complete construction and the general application of my form of tire tool will be readily apparent.

The manner my improved tire tool is used is as follows:

When it is desired to remove the tire from the rim, the hook end 11 of the lever 1 is used like an ordinary tire iron or jack in starting one edge of the tire out of the rim flange, as shown in Fig. 5 and, after the lever 1 is inserted, as indicated in full lines in the said figure, the said lever 1, is swung down to the full line position shown in Fig. 1 and in dotted lines on Fig. 5, working from the inside of the rim with the hand lever pointed toward the wheel hub, and at this point, it should be stated, that when replacing a tire, the position of my tire tool is reversed, i. e., the lever is projected outwardly from the tire and the rim, as shown in Fig. 2.

My construction of tire tool is such that the same is adapted for adjustment to any size rim and, when applied for removing the tire, it is adjusted by turning the nut 3 to release the carriage or block 2 to permit of the said carriage being shifted, so that the inner spur edge or pawl 20 engages the desired cross notches 13 in the lever 1, thereby shortening or lengthening the distance between the head 41 of the lever 4 and the hook 11 of the lever 1 according to the width of the rim edge $x'$.

My improved tire iron can also be adjusted to fit various sizes of flanges on the rim, as shown in Fig. 2, since the head or tip end 41 of the lever is close enough to the hook 11 of the lever 1 to clamp against a rim of the thinnest metal, it being understood that for rims of different widths, the lever 4 may be shifted back, as desired, by the proper adjustment of the block 2 and the nut 3, as hereinbefore stated, the conical bearing face of the nut serving to provide for a perfect connection of the block 2, when the lever 4 is held locked to the position shown in Fig. 1 and, when the block 2, is adjusted as in Fig. 2.

By reason of the peculiar construction and combination of the parts that constitute my improved tire iron or " jack " which, in practice, is preferably of malleable iron so that it will be strong and durable, the " jack," when not in use, may be readily folded up as in Fig. 2 and conveniently carried in a tool kit.

For holding the hook member 4 to its extended or folded positions, I provide a stout leaf spring 42 that is shaped to snugly fit over the inner claw 20 and between the bifurcated portion 33 of the carrier and whose outer end engages the squared end of the member 4 beyond its fulcrum, as is best shown in Fig. 4.

When my improved construction of tire tool is used to remove the tire from the rim, the hook end 11 of the lever 1 is applied like an ordinary tire iron, as is shown in Fig. 5, and after the lever has been thus inserted, as indicated in full lines in the said Fig. 5, it is swung down to the position shown in Fig. 1 and in dotted lines on Fig. 5 and the hook member 4 is then swung up to cause its hook portion 40 to engage with the opposite edge of the rim and with its flat face 41 to engage with the opposite side of the tire, as indicated in the said Figs. 1 and 5, by reference to which it will be also observed that when the tool is adjusted as stated, the lever 1 works inside of the rim and is projected toward the wheel hub, it being also apparent that, when adjusted to the said mentioned position, that by proper shifting and clamping of the block 2, the member 4 is conveniently held in engagement with the said opposite rim edge and the adjacent tire side, as the tool is moved along while removing the tire edge as the hook end 11 of the lever 1 is moved along the said rim edge.

By reason of the peculiar formation of the head end of the member 4 and the manner of adjustably connecting the said lever 4 with the lever 1, my improved tool is readily adapted for adjustment to any thickness of rim, when used for replacing a tire and, at this point, it should be stated, that when used for replacing a tire, the position of the tire tool is reversed from that shown in Figs. 1 and 5, i. e. the lever 1 is projected outwardly from the tire rim, as is shown in Fig. 2.

When the tool is to be utilized for replacing a tire, the member 4 is swung inwardly with its flat face 41 against the inner or notched face of the lever 1, and adjusted along the said lever 1 by turning the nut 3 to release the carriage or block 2 so that the inner spur edge 20 thereof can be moved into position for engaging the desired one of the notches 13 to thereby provide for adjusting the head 41 of the said lever relatively to the hook 11 of the lever 1 according to the thickness of the rim edge $x'$, as is clearly shown in Fig. 2, by reference to which and to Fig. 4, it will be readily apparent that the conical bearing face of the nut provides for such a perfect connection of the block 2, when shifting the said head 40 of the member 4 toward the hook 11, so as to hold the said head 40 substantially locked to the position shown in Figs. 1 and 2, while manipulating the tool during the operation of removing or replacing the tire.

What I claim is:

In a tire tool of the character described, the combination with a prying off lever having a ratchet face and a longitudinal slot, a hook member coöperative with the prying off lever, said hook member having pivotal connection relatively to the said prying off lever, which connection consists of a bearing block to which the hook member is pivotally joined, the said block having a stem slidable within the slot in the prying off lever and a threaded stub, a clamp nut that engages the threaded stub and is provided with a conical bearing for engaging the prying off lever, the said block having oppositely disposed edge pawls for engaging with the ratchets in the prying off lever.

GEORGE A. STROBECK.